United States Patent
Whitmore

(10) Patent No.: US 9,275,506 B1
(45) Date of Patent: Mar. 1, 2016

(54) SYSTEMS AND METHODS FOR OFF-LINE STORED VALUE CARD TRANSACTIONS

(75) Inventor: Martin F. Whitmore, Hanson, MA (US)

(73) Assignee: NBC Operating, LP, Framingham, MA (US)

( * ) Notice: Subject to any disclaimer, the term of this patent is extended or adjusted under 35 U.S.C. 154(b) by 558 days.

(21) Appl. No.: 11/514,432

(22) Filed: Sep. 1, 2006

(51) Int. Cl.
 G06K 5/00 (2006.01)
 G07F 7/10 (2006.01)

(52) U.S. Cl.
 CPC .................... G07F 7/1008 (2013.01)

(58) Field of Classification Search
 USPC ........................................................ 235/380
 See application file for complete search history.

(56) References Cited

U.S. PATENT DOCUMENTS

| | | | |
|---|---|---|---|
| 4,707,592 A | 11/1987 | Ware | |
| 5,479,510 A | 12/1995 | Olsen et al. | |
| 5,732,136 A | 3/1998 | Murphee et al. | |
| 6,003,762 A | 12/1999 | Hayashida | |
| 6,032,859 A | 3/2000 | Muehlberger et al. | |
| 6,167,387 A * | 12/2000 | Lee-Wai-Yin | 705/41 |
| 6,330,544 B1 | 12/2001 | Walker et al. | |
| 6,405,182 B1 | 6/2002 | Cuervo | |
| 6,473,500 B1 | 10/2002 | Risafi et al. | |
| 6,529,880 B1 * | 3/2003 | McKeen et al. | 705/17 |
| 6,575,361 B1 | 6/2003 | Graves et al. | |
| 6,805,289 B2 | 10/2004 | Noriega et al. | |
| 6,938,019 B1 | 8/2005 | Uzo | |
| 7,003,496 B2 | 2/2006 | Ishii et al. | |
| 7,131,575 B1 * | 11/2006 | Kolls | 235/379 |
| 2001/0015987 A1 * | 8/2001 | Wegner et al. | 370/503 |
| 2005/0051619 A1 | 3/2005 | Graves et al. | |
| 2006/0026073 A1 | 2/2006 | Kenny, Jr. et al. | |
| 2006/0032911 A1 | 2/2006 | Arias | |
| 2006/0149671 A1 | 7/2006 | Nix et al. | |
| 2006/0163347 A1 * | 7/2006 | Foss et al. | 235/380 |

* cited by examiner

Primary Examiner — Rafferty Kelly
(74) Attorney, Agent, or Firm — Ropes & Gray LLP

(57) ABSTRACT

Systems and methods for processing an off-line stored value card transaction are provided. The store where the gift card transaction is being processed may save stored value card account information for a plurality of stored value cards. For example, the store may maintain stored value card account information for cards that were issued at the store or previously used at the store. When the store is off-line and cannot verify a stored value card using a home office, the store may verify the card using the account information that is locally saved. The store may upload information for stored value card transactions that occurred while the store was off-line to the home office once the store is back online. The home office may update the store's account information at regular intervals when the store is online.

28 Claims, 4 Drawing Sheets

SYSTEMS AND METHODS FOR OFF-LINE STORED VALUE CARD TRANSACTIONS

BACKGROUND OF THE INVENTION

This invention is directed to systems and methods for redeeming or issuing stored value cards and other store issued credit during a communications failure between the store and the centralized location at which records for all stored value card and store credit accounts are kept.

Stores and other point-of-sale locations accept payment for goods or services in a number of forms. One form that has become common is credit issued by the store for exclusive use in the store. If the store is part of a chain or connected or related to other stores (e.g., in a strategic association), the customer may be permitted to use the store credit in any of the related stores. The store credit may be provided to a customer in a number of ways, the most common of which include gift cards, gift certificates, merchandise credits, and stored value cards.

To ensure that a customer's store credit is appropriately reduced each time the customer uses store credit to make a purchase, and to ensure that a customer has sufficient store credit to make a purchase, a home office may be used to record purchases and save current store credit account information for each customer. The term "home office" is used throughout for illustrative purposes and my be any central location. For example, when a customer wishes to use store credit at a store, the store may request authorization from the home office to process the transaction. If the home office determines that the customer has sufficient store credit for the transaction, the home office may send an authorization signal to the store. If the customer has sufficient store credit for a portion of the transaction, the home office may send partial authorization.

When the communications link between the store and the home office is down, however, the store cannot request nor receive authorization from the home office for a store credit transaction. Instead, the store must either request an alternate form of payment, or call the home office and manually request and receive authorization for a transaction. Both of these solutions are burdensome to the store, and susceptible to creating delays and unsatisfactory service for customers. Accordingly, there is a need for systems and methods for efficiently processing store credit transactions when a store is off-line.

SUMMARY OF THE INVENTION

In accordance with the principles of the present invention, systems and methods are provided for efficiently processing store credit transactions when a store is off-line. In particular, systems and methods are provided for saving or storing store credit account information at the store, and processing store credit transactions using the locally saved account information.

For clarity and simplicity, the term "stored value card" in this application will be used to encompass stored value cards, prepaid cards, gift cards, gift certificates, merchandise credit, store credit, and any other credit issued by a store.

A customer at a store may desire to make a transaction (e.g. a purchase) using a stored value card. In response to receiving a request to process a stored value card transaction, verification software operating at the store may determine whether the store is off-line. For example, the verification software may determine whether communications with a home office are possible. If the verification software determines that the store is off-line, and that it cannot receive authorization from the home office to process the stored value card transaction, the verification software may determine whether the store has locally saved account information for the stored value card. Or, in the case of issuing a stored value card, the verification software may determine whether new account information can be temporarily stored locally.

If the verification software determines that account information for the stored value card is locally available, the verification software may process the transaction using the locally available information, and update the local account information to reflect the off-line transaction. Additionally, if store credit is being given to a customer in the off-line transaction (e.g., the customer is purchasing a gift card), the new information may be stored locally. Once the store comes back online, the verification software may transmit updated account information for the stored value cards that were used or purchased in off-line transactions to the home office so that the centralized stored value card account information at the home office is complete and accurate.

To ensure that each store has current account information for all stored value cards, the home office may send each store a file with current account information at pre-determined times (e.g., every night). The file may be updated throughout the day by the home office and/or locally. This may allow a store to have the most up-to-date account information available locally to accurately process off-line stored value card transactions.

Because it may be inefficient to download account information for every stored value card to a store (e.g., too time consuming, or require too much memory), the home office and/or the store may identify a subset of stored value cards for which the store will maintain account information (e.g., the subset of stored value cards that are most likely to be used at the store). The home office and/or store may use any suitable criteria to determine which stored value cards to select for the subset. For example, the store may maintain account information for stored value cards that were created at the store, or that were used at the store in the past.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

Figure 1:
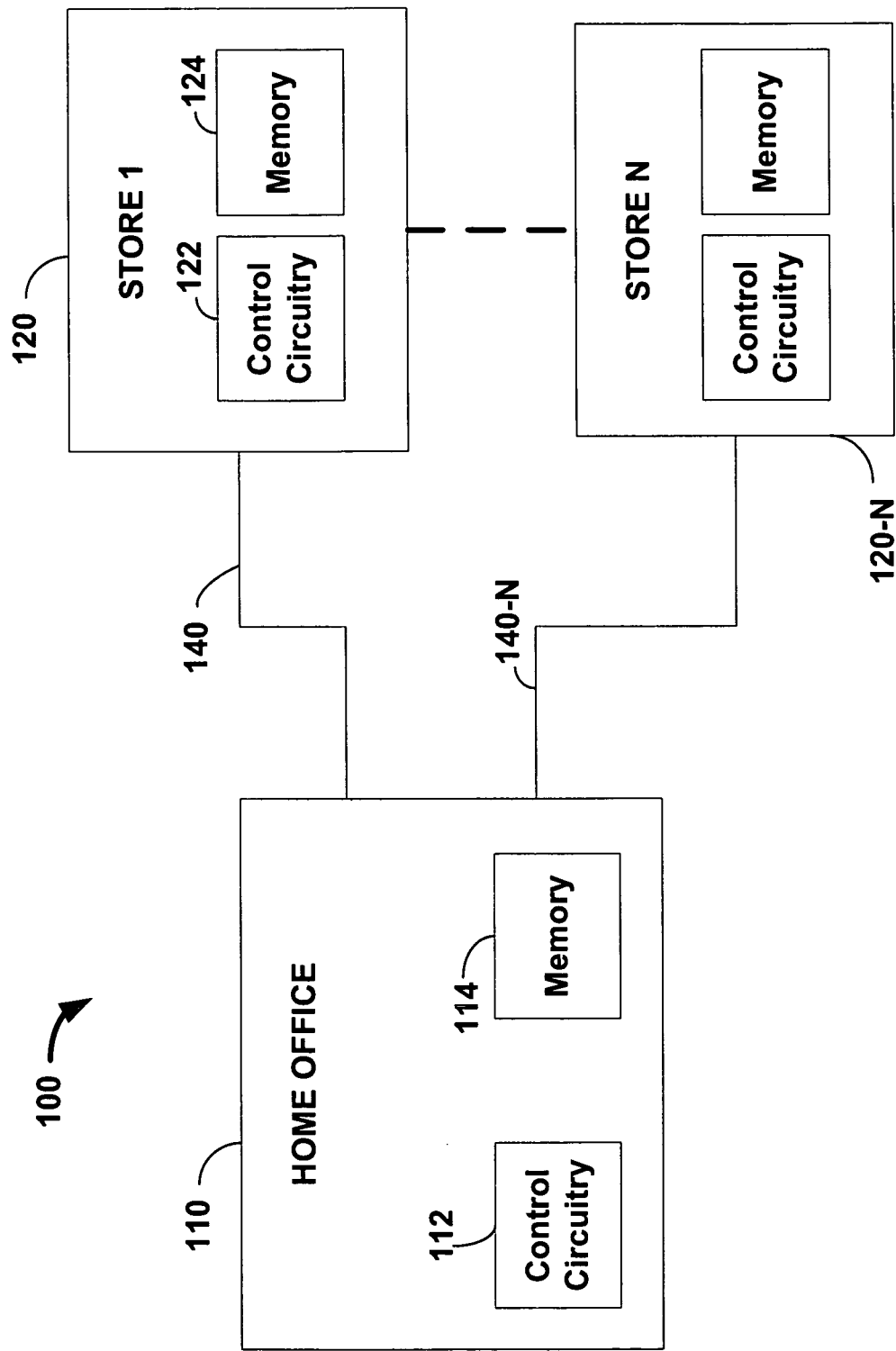
FIG. 1 is a diagram of an illustrative store system in accordance with one embodiment of the present invention.

FIG. 1 shows illustrative store system 100 in accordance with one embodiment of the present invention. Store system 100 includes home office 110, and stores 120 and 120-N. In practice, there may be multiple home offices 110 and stores 120 and 120-N, but only one home office and two stores have been shown in FIG. 1 to avoid over-complicating the drawing.

Home office 110 may be any suitable system for storing stored value card account information. For example, home office 110 may include a server or other data center for storing and manipulating account information and other data. Home office 110 includes control circuitry 112 and memory 114.

Control circuitry 112 is adapted to receive communications from stores 120 and 120-N and execute the instructions of home office software implemented at home office 110. Control circuitry 112 may include one or more processors (e.g., a micro-processor), memory, communications circuitry (e.g., cable modem or ethernet circuitry), input/output circuitry (e.g., graphics circuitry), or any other component or circuitry for verifying stored value card accounts and communicating information about stored value card accounts to the stores.

Memory 114 may be any suitable memory for storing or saving stored value card account information such as, for example, one or more hard-drive arrays, hard discs, server arrays, RAM, SRAM, DRAM, ROM, flash memory, or any other suitable memory. In the example of FIG. 1, memory 114 is shown as a component of home office 110, but in other embodiments, memory 114 may be a stand-alone component. In some embodiments, memory 114 may save data provided by control circuitry 112 or stores 120 and 120-N.

Home office 110 may communicate with one or more stores 120 and 120-N via communications path 140 and 140-N. Communications paths 140 and 140-N may be any suitable communications path including, for example, a satellite path, a fiber-optic path, a cable path, an Internet path, or any other suitable wired or wireless path. Communications paths 140 and 140-N may be configured to transport information both to and from home office 110, and to and from stores 120 and 120-N. Each store may have a dedicated communications path to home office 110, or may share a communications path with one or more other stores.

Store system 100 includes illustrative stores 120 and 120-N. Stores 120 may include physical stores, kiosks, retail or service interfaces that are remotely accessible (e.g., over the internet), a point-of-sale ("POS") or any other location or interface for selling goods or services. For clarity and simplicity, all suitable locations or interfaces for selling goods or services will be referred to as "stores" in the present application. Any suitable number of stores may be in the system. All of the stores may include similar or identical components. Illustrative store 120 includes control circuitry 122 and memory 124.

Control circuitry 122 is adapted to receive communications from home office 110 and execute the instructions of verification software implemented at store 120. In some embodiments, the home office software and the verification software may be the same software operating at different locations. In some embodiments, the software may be hosted by a dedicated server, or one or more of the home office and the stores may house the software, for example in a client/server approach. For clarity, however, the following discussion will distinguish between the home office software and the verification software.

Control circuitry 122 may include one or more processors (e.g., a micro-processor), memory, communications circuitry (e.g., cable modem or ethernet circuitry), input/output circuitry (e.g., graphics circuitry), or any other component or circuitry for verifying stored value card accounts and communicating information about the accounts to the stores. In some embodiments, control circuitry 122 may include one or more user input devices for entering stored value card information (e.g., a magnetic card reader, a keyboard, or a bar code scanner). The verification software may be configured to process any transaction that a cashier may need to process at a store (e.g., standard purchases, refunds, creating gift cards, or verifying gift card purchases).

Memory 124 may be any suitable memory for saving stored value card account information such as, for example, one or more hard-drive arrays, hard discs, server arrays, RAM, SRAM, DRAM, ROM, flash memory, or any other suitable memory. In the example of FIG. 1, memory 124 is shown as a component of store 120, but in other embodiments, memory 124 may be a stand-alone component. In some embodiments, memory 124 may save data provided by control circuitry 122 (e.g., in connection with stored value card transactions) or home office 110 (e.g., account information updates provided by the central server).

In some embodiments, one or more stores may be connected by one or more communications links (not shown). For example, a number of stores located within a given distance (e.g., within the same city, county or state) may be connected by a communications link. In some embodiments, two or more stores may share a local memory 124 for saving stored value card account information.

In some embodiments, the verification software may process transactions and perform other operations with a client/server approach. There may be one server for each instance of store 120, one for multiple instances of store 120, or a single server may serve as a proxy for each instance of store 120.

When a store creates a stored value card (e.g., a gift card) for a customer, the verification software implemented at the store provides information related to the gift card to home office 110. The information provided may include the card number (e.g., an account number), the amount stored on the card or in the associated account, an expiration date for the card (e.g., if the card is not redeemable in perpetuity), or any other suitable information. The home office software operating on control circuitry 112 may direct the control circuitry to save the stored value card information provided by the store in memory 114. In some embodiments, the verification software may also direct control circuitry 122 to save the stored value card information in local memory 124.

In some embodiments, if the user of the invention so chooses, the verification software or the home office software may store in memory the name and address of the person purchasing the card, or the name and address of the person who will receive the card (e.g., if the card is a gift). The verification software and home office software may store this information provided there are no laws that prohibit customer names and addresses from being associated with stored value card accounts. In embodiments where the user does not desire such functionality, or where such functionality is prohibited by law, the following discussion will assume that customer names and addresses are not stored in memory.

Figure 2:
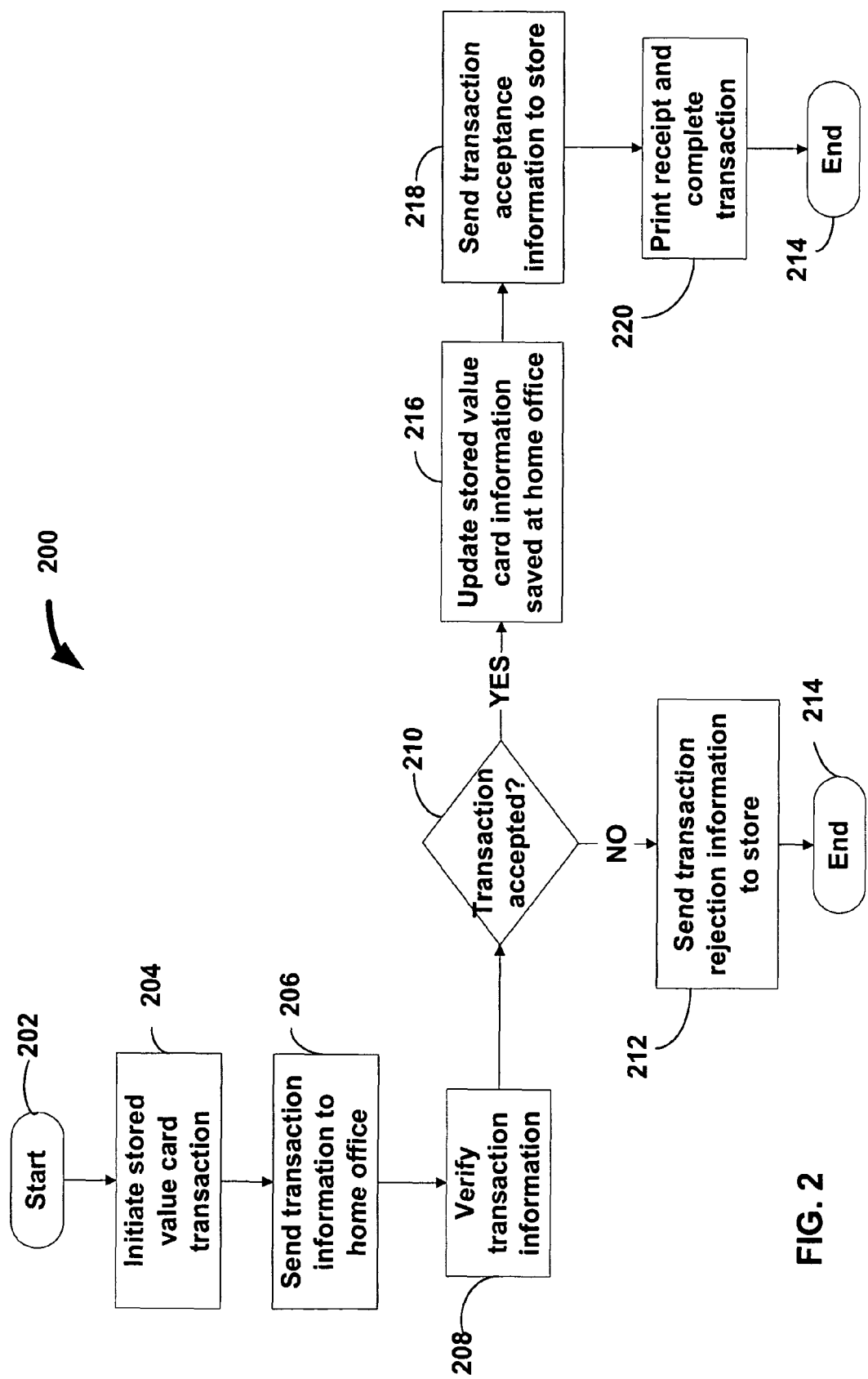
FIG. 2 is a flow chart of an illustrative process for processing a stored value card transaction when the store is online in accordance with one embodiment of the present invention.

Once a stored value card has been issued, a customer in possession of the card may subsequently use the card to make a purchase. FIG. 2 shows illustrative process 200 for making a stored value card purchase when communications link 140 between store 120 and the home office 110 is operating. This process may also be used for any other transaction that is performed with a stored value card. Process 200 begins at step 202. At step 204, a stored value card transaction is initiated at the store. For example, a cashier may swipe a gift card in a magnetic card reader so that control circuitry 122 (FIG. 1) may determine the gift card account number. At step 206, the verification software sends transaction information to home office 110. For example, the verification software may direct control circuitry 122 to transmit the transaction information over communications link 140. The transaction information may include, for example, information identifying the stored value card account (e.g., account number), purchase information (e.g., the product being purchased, the total cost), or any other suitable information.

At step 208, the home office software verifies the transaction information. For example, the home office software may retrieve the account information associated with the stored value card used at step 204 from memory 114 (FIG. 1). The information saved in memory may include the amount of money remaining and available on the stored value card, as well as an expiration date. The home office software may verify that the purchase amount does not exceed the balance remaining and available on the stored value card, and that the stored value card has not expired (e.g., if the stored value card has an expiration date). In some embodiments, the stored value card may not have an expiration date.

At step 210, the home office software determines whether the transaction is accepted. For example, the home office software may determine the result of verification step 208. If the home office software determines that the transaction is not accepted (e.g., the stored value card does not have enough money available for the transaction), process 200 moves to step 212. At step 212, the home office software sends a communication to the store indicating that the stored value card was not accepted. For example, the home office software may direct control circuitry 112 to send a communication over communications link 140 to store 120. The cashier may then indicate to the customer that the stored value card was not accepted, and request an alternate form of payment from the customer. Process 200 then ends at step 214.

If, at step 210, the home office software instead determines that the transaction is accepted, either partially or in full (e.g., the stored value card has enough money available for all or part of the transaction, and has not expired), process 200 moves to step 216. At step 216, the home office software directs control circuitry 112 and 122 to update the entry in memory 114 and memory 124 that is associated with the stored value card account. For example, control circuitry 112 and 122 may save a record of the transaction and the updated balance available on the stored value card (e.g., the amount of the current transaction subtracted from the prior amount available on the card). At step 218, the home office software sends transaction acceptance information to the store. This may prompt the cashier to indicate that part of the transaction was approved, but that additional payment of another form will be required to complete the transaction. For example, the home office software may direct control circuitry 112 to transmit an authorization code for the transaction. As another example, the home office software may direct control circuitry 112 to send store 120 a message indicating that the transaction was accepted. As still another example, the home office software may direct control circuitry 112 to indicate to store 120 the balance remaining in the stored value card account. At step 220, the verification software prints out a receipt for the customer, and concludes the transaction. Process 200 then ends at step 214.

In some cases, however, the communications path between the store and the home office (e.g., communications path 140) is interrupted. For example, the network connecting the store and the home office may be disconnected or disabled. As another example, the home office may be unavailable because of software or hardware upgrades. In such cases, the store cannot send transaction information to the home office over the communications path for verification. To authorize a gift card transaction, the store must call the home office directly to get approval for a particular stored value card. This approach is time consuming, and therefore leads to customer dissatisfaction. Accordingly, there is a need for another approach.

Figure 3:
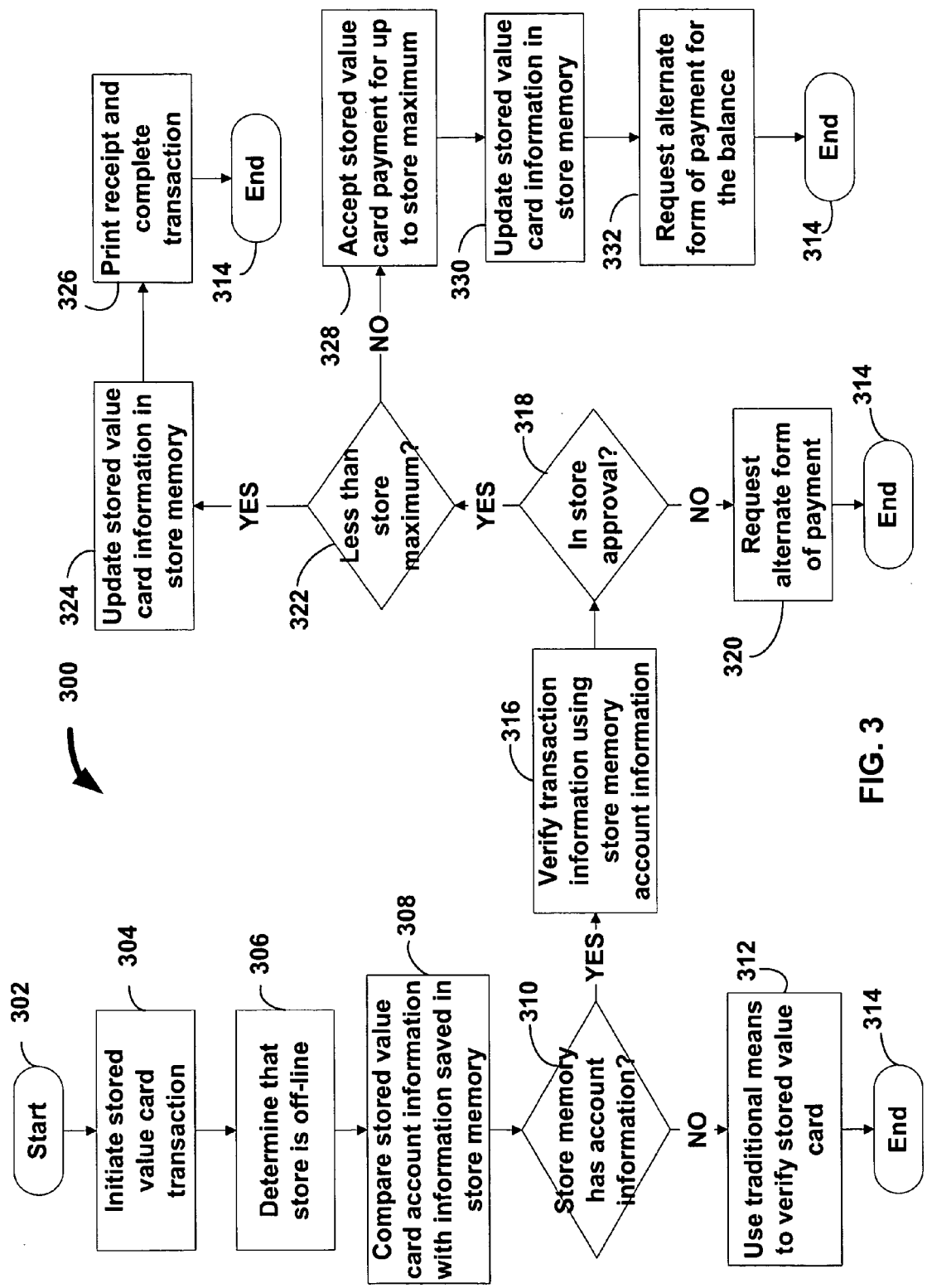
FIG. 3 is a flow chart of an illustrative process for processing a stored value card transaction when the store is off-line in accordance with one embodiment of the present invention.

FIG. 3 shows illustrative process 300 for verifying a stored value card purchase when the store is off-line. This process may also be used for any other transaction that is performed with a stored value card (e.g., refund, return, or balance transfer). Process 300 begins at step 302. At step 304, a stored value card transaction is initiated at the store. For example, a cashier may swipe a gift card in a magnetic card reader so that control circuitry 122 (FIG. 1) may determine the gift card account number. At step 306, the verification software implemented at the store determines that the store is off-line. For example, the verification software may send a communication to home office 110 (FIG. 1) over communications link 140 (FIG. 1) and not receive a response. As another example, home office 110 may predict or know that it will be off-line at a given time, and warn store 120 (FIG. 1) that it will be off-line (e.g., for scheduled system maintenance or upgrades).

At step 308, the verification software compares the stored value card account information with account information stored or saved in the store memory. For example, the verification software may direct control circuitry 122 to compare the account number associated with the stored value card with the account numbers saved in store memory 124 (FIG. 1).

At step 310, the verification software determines whether the store memory has account information for the stored value card used in the transaction. For example, the verification software may determine whether, at step 308, control circuitry 122 determined that the stored value card account information was saved in memory 124. If, at step 310, the verification software determines that the store memory does not have account information for the stored value card, process 300 moves to step 312. At step 312, the verification software directs the operator at the store (e.g., the cashier) to use traditional means to verify the stored value card account information (e.g., by calling the home office). Process 300 then moves to step 314 and ends. In some embodiments, if the transaction is to issue money to a stored value card, process 300 moves to step 330, where value (e.g., money) is added to the card.

If, at step 310, the verification software instead determines that the store memory has saved account information for the stored value card, process 300 moves to step 316. At step 316, the verification software verifies the transaction information using the account information saved in the store memory. For example, the verification software may direct control circuitry 122 to retrieve the account information associated with the stored value card from memory 124. The information saved in memory may include the balance remaining and available on the stored value card, as well as an expiration date. Control circuitry 122 may verify that the purchase amount does not exceed the balance remaining and available on the card, and that the card has not expired (e.g., if the card has an expiration date).

At step 318, the verification determines whether the stored value card is accepted. For example, the verification software may determine the result of verification step 316. If the verification software determines that the stored value card is not accepted (e.g., the stored value card is expired), process 300 moves to step 320. At step 320, the verification software indicates to the operator (e.g., a cashier) that the stored value card was not accepted, and directs the cashier to request an alternate form of payment from the customer (e.g., when the transaction is a purchase). Process 300 then ends at step 314.

If, at step 318, the verification software instead determines that the stored value card is accepted (e.g., the stored value card has enough money for all or part of the transaction and the card has not expired), process 300 moves to step 322. At step 322, the verification software determines whether the purchase amount exceeds the maximum for off-line stored value card purchases. For example, the store may have a per card limit of $999.99 for off-line stored value card purchases to limit fraud (e.g., to prevent a fraudulent user of a gift card from re-using the same gift card for very large transactions in different stores when the stores are off-line). If the verification software determines that the purchase amount does not exceed the store maximum, process 300 moves to step 324. In some embodiments, there may be no store maximum. In that case, process 300 always moves to step 324.

At step 324, the verification software updates the stored value card account information in the store memory. For example, the verification software may direct control circuitry 122 to modify the entry for the stored value card account in memory 124 to include a record of the transaction and to reflect the new balance of the card (e.g., the amount of the current transaction subtracted from the prior amount available on the card). The verification software may also mark or flag the updated entry for the stored value account in memory for transmission to the home office once communications are re-established. At step 326, the verification software prints a receipt for the customer, and concludes the transaction. Process 300 then ends at step 314.

If, at step 322, the verification software instead determines that the purchase amount exceeds the store maximum, process 300 moves to step 328. At step 328, the verification software accepts the stored value card for up to the maximum amount (e.g., $999.99). At step 330, the verification software updates the stored value card account information in the store memory. For example, the verification software may direct control circuitry 122 to modify the entry for the stored value card account in memory 124 to include a record of the transaction and to reflect the new balance of the card (e.g., the store maximum amount subtracted from the prior amount available on the card). The verification software may also mark or flag the updated entry for the stored value account in memory for transmission to the home office once communications are re-established.

At step 332, the verification software requests an alternate form of payment for the balance of the transaction. For example, the verification software may prompt the cashier to request a credit card, cash, or another stored value card from the customer to pay the balance of the purchase. Process 300 then moves to step 314 and ends.

To make sure that the store has the most current stored value card information, and to make sure that the home office has transaction information for stored value card purchases made while the store was off-line, the verification software and the home office software may transmit stored value card account information to each other at any suitable time, such as on a regular basis, or as soon as a store comes back online. For example, the verification software may transmit a store end-of-day file that includes transaction information for the stored value card transactions that were processed at the store using account information saved in the store memory (e.g., while the store was off-line). As another example, the home office software may transmit a home office end-of-day file that includes current account balances for one or more stored value cards to the store every evening. In the case of issuing stored-value cards when a store is off-line, account information for the new account may be stored locally until the store is back on-line or until the store's next upload to the home office.

Figures 4, 5:
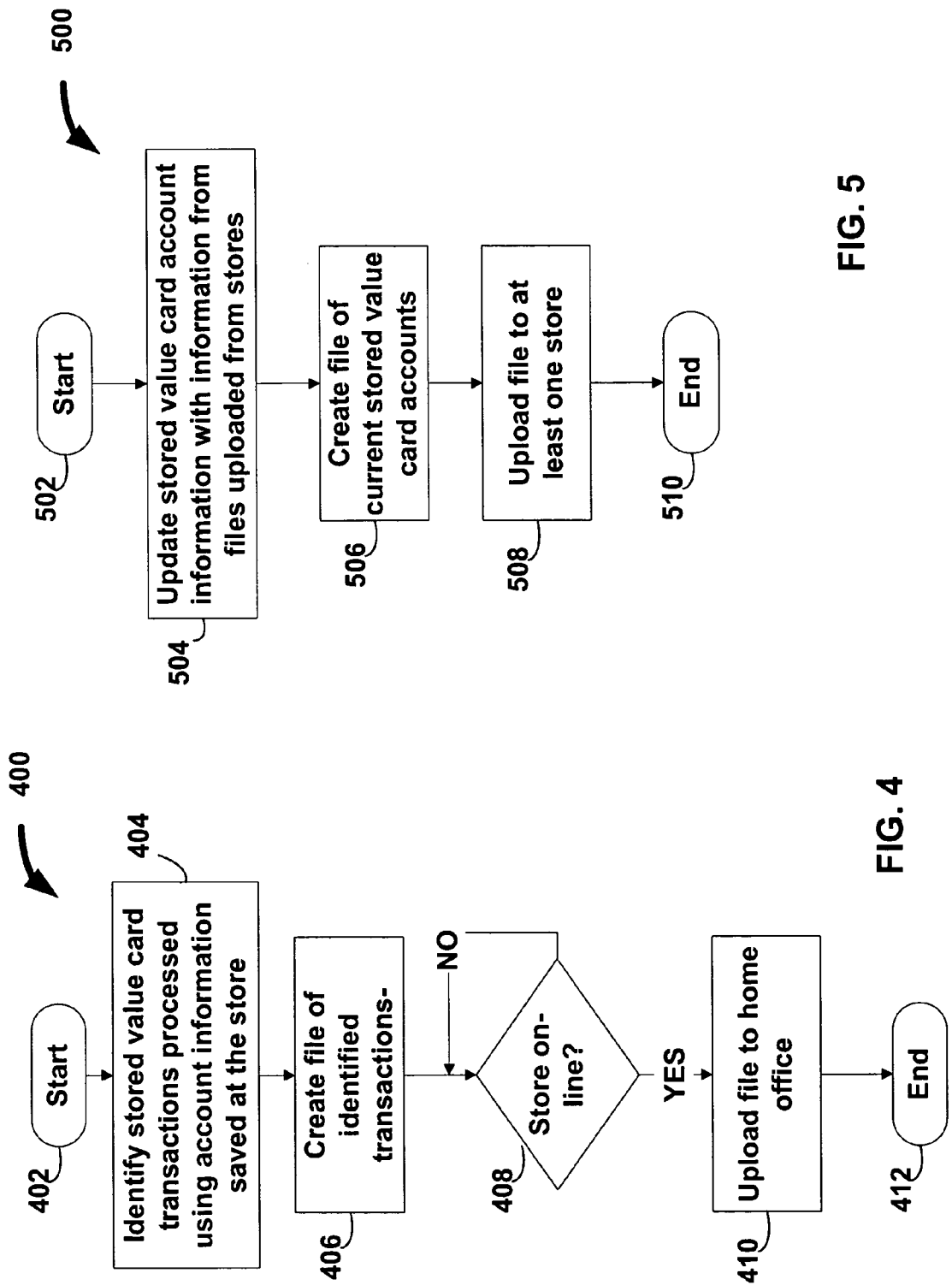
FIG. 4 is a flow chart of an illustrative process for uploading a file of stored value card transactions to the home office in accordance with one embodiment of the present invention.
FIG. 5 is a flow chart of an illustrative process for updating a store's stored value card account information in accordance with one embodiment of the present invention.

FIG. 4 shows illustrative process 400 for updating the home office stored value card account information with information for stored value card transactions that were processed using stored value card account information stored or saved at the store. The verification software may execute process 400 at any suitable time such as, for example, continuously, after each transaction, at one or more fixed times during the day (e.g., at noon and at after closing), once the store comes back online, upon a user request, or at any other suitable time. Process 400 begins at step 402. At step 404, the verification software identifies the stored value card transactions that were processed using the stored value account information stored or saved at the store since the last upload to the home office (e.g., since before the store went off-line). For example, the verification software may direct control circuitry 122 (FIG. 1) to identify in memory 124 (FIG. 1) the transactions that were marked or flagged as having been off-line gift card transactions (e.g., marked or flagged at steps 324 and 330 of process 300, FIG. 3).

At step 406, the verification software creates a file of the transactions identified at step 404. The file (e.g., a store end-of-day file) may include a transaction identifier (e.g., an ID number), the stored value card account number, the transaction amount, and any other suitable information. At step 408, the verification software determines whether the store is online. For example, the verification software may direct control circuitry 122 to send a communication over communications link 140 (FIG. 1) to home office 110 (FIG. 1), and determine whether the home office sends a response. If the verification software determines that the store is off-line, process 400 goes back to step 408 and continues to determine whether the store is back online yet.

If, at step 408, the verification software instead determines that the store is online, process 400 moves to step 410. At step 410, the verification software uploads the file created at step 406 to the home office. For example, the verification software may direct control circuitry 122 to transmit the file over communications link 140 to home office 110. Process 400 then ends at step 412.

FIG. 5 shows illustrative process 500 for updating the home office records and sending home office stored value card account updates to the stores. Process 500 begins at step 502. At step 504, the home office software updates the stored value card information with information provided by the stores. For example, the home office software may direct control circuitry 112 (FIG. 1) to update the account information stored or saved in memory 114 (FIG. 1) with the account information for off-line gift card transactions (e.g., information provided by store end-of-day files transmitted by process 400, FIG. 4). At step 506, the home office software creates a file of current stored value card accounts. The file (e.g., a home office end-of-day file) may include the stored value card account numbers, the current balance available an expiration date for each stored value card, and any other suitable information. At step 508, the home office software transmits the file to one or more stores. For example, the home office software may direct control circuitry 112 to transmit the file over communications links 140 and 140-N (FIG. 1) to stores 120 and 120-N (FIG. 1). The stores may then update their local stored value card records with the file sent by the home office (e.g., saved in memory 124, FIG. 1). Process 500 ends at step 510.

It may be inefficient for the home office software to send each store a complete file of all existing stored value card accounts every evening. In particular, it may be inefficient because only a small number of existing stored value cards may have been used during the day. Instead, it may be more efficient for the home office software to identify the stored value card accounts that were modified since the last file download (e.g. last home office end-of-day file download), and only send each store a file that contains updated information for those stored value card accounts. If a store only has a subset of all existing stored value card accounts saved in local memory, the home office software may send the store a file that only contains updated account information for the stored value cards accounts that are saved at the store and that were modified since the last file transfer.

In some embodiments, the store memory may not be sufficiently large to store or save account information for every stored value card. In such embodiments, the store and the home office may make a determination as to which stored value cards have their account information saved at the store.

The home office software and/or verification software may determine which stored value card accounts to keep at the store based on any suitable criteria. For example, a store memory may include account information for stored value cards that were created, issued or purchased at the store (e.g., gift cards purchased at the store, or merchandise credit for items that were returned to the store). As another example, a store memory may include account information for all stored value cards that have been used at the store in the past.

In some embodiments, a store memory may include account information for a stored value card that is associated with a person that has, in the past, shopped in the store (e.g., using credit card records to identify past customers and compare those customers with those associated with particular stored value cards). In some embodiments, if the user of the invention so chooses, a store memory may include account information for stored value cards that are associated with a user's address that is within a given distance from the store. These embodiments may be implemented if the user desires such functionality, provided there are no laws that prevent the store or home office from associating stored value card accounts with customer names or addresses.

In some embodiments, stores that are within a given distance from each other, or otherwise geographically related, may all maintain the same stored value card accounts in their respective stores. This may be particularly desirable when there are a plurality of stores in the same city.

The above described embodiments of the present invention are presented for purposes of illustration and not of limitation, and the present invention is limited only by the claims which follow.

What is claimed is:

1. A method for processing a transaction at a store, comprising:
   storing, by control circuitry, account information for a stored value card in a memory at the store, wherein the account information for a stored value card includes at least account balance information received from a central location having stored value card account information;
   determining, by the control circuitry, that there is a communications failure between the store and the central location;
   receiving, by the control circuitry, a request to process a transaction using a stored value card; and
   in response to determining that there is a communication failure, processing, by the control circuitry, the transaction using the stored value card account balance information stored at the store, processing the transaction including:
   determining whether an amount of the transaction exceeds a maximum for off-line transactions, and
   in response to determining that the amount of the transaction does not exceed the maximum, updating the stored value card account balance information stored at the store.

2. The method of claim 1 wherein the stored value card is one of a stored value card, prepaid card, gift card, gift certificate, merchandise credit, and store credit.

3. The method of claim 1 wherein the transaction is one of a purchase, refund, return, and balance transfer.

4. The method of claim 1 further comprising:
   determining, by the control circuitry, whether the account information for the stored value card is stored at the store; and
   wherein processing the transaction using the stored value card account information stored at the store further comprises processing the transaction using the stored value card account information stored at the store in response to determining that the account information for the stored value card is stored at the store.

5. The method of claim 1 wherein storing account information for a stored value card at the store further comprises storing stored value card account information for a subset of all existing stored value cards.

6. The method of claim 5 wherein storing account information for a stored value card at the store further comprises:
   determining, by the control circuitry, whether the stored value card was issued at the store; and
   in response to determining that the stored value card was issued at the store, selecting, by the control circuitry, the stored value card for the subset of existing stored value cards.

7. The method of claim 5 wherein storing account information for a stored value card at the store further comprises:
   determining, by the control circuitry, whether the stored value card was previously used at the store; and
   in response to determining that the stored value card was previously used at the store, selecting, by the control circuitry, the stored value card for the subset of existing stored value cards.

8. The method of claim 1 wherein storing account information for the stored value card at the store further comprises storing, by the control circuitry, account information for the stored value card in a store server.

9. The method of claim 1 further comprising receiving, by the control circuitry, stored value card account information updates from the central location.

10. The method of claim 9 wherein receiving stored value card account information updates comprises receiving, by the control circuitry, account information updates at pre-determined times.

11. The method of claim 9 wherein receiving stored value card account information updates comprises receiving, by the control circuitry, stored value card account information updates for the stored value cards stored at the store.

12. The method of claim 1 further comprising:
   determining, by the control circuitry, that the store is online; and
   in response to determining that the store is online, transmitting, by the control circuitry, stored value card account information stored at the store to the central location.

13. The method of claim 12 wherein transmitting stored value card account information stored at the store further comprises transmitting, by the control circuitry, information regarding stored value card transactions that were processed using stored value account information stored at the store to the central location.

14. The method of claim 1 wherein the central location is a home office.

15. A system for processing a transaction at a store, the system comprising control circuitry configured to:
- store account information, including account balance information received from a central location having stored value card account information, for a stored value card at the store;
- determine that there is a communications failure between the store and the central location;
- receive a request to process a transaction using a stored value card; and
- in response to determining that there is a communication failure, process the transaction using the stored value card account balance information stored at the store, processing the transaction including:
- determining whether an amount of the transaction exceeds a maximum for off-line transactions, and
- in response to determining that the amount of the transaction does not exceed the maximum, updating the stored value card account balance information stored at the store.

16. The system of claim 15 wherein the stored value card is one of a stored value card, prepaid card, gift card, gift certificate, merchandise credit, and store credit.

17. The system of claim 15 wherein the transaction is one of a purchase, refund, return, and balance transfer.

18. The system of claim 15 wherein the control circuitry is further configured to:
- determine whether the account information for the stored value card is stored at the store; and
- process the transaction using the stored value card account information stored at the store in response to determining that the account information for the stored value card is stored at the store.

19. The system of claim 15 wherein the control circuitry is further configured to store stored value card account information for a subset of all existing stored value card.

20. The system of claim 19 wherein the control circuitry is further configured to:
- determine whether the stored value card was issued at the store; and
- in response to determining that the stored value card was issued at the store, select the stored value card for the subset of existing stored value cards.

21. The system of claim 19 wherein the control circuitry is further configured to:
- determine whether the stored value card was previously used at the store; and
- in response to determining that the stored value card was previously used at the store, select the stored value card for the subset of existing stored value cards.

22. The system of claim 15 wherein the control circuitry is further configured to store account information for the stored value card in a store server.

23. The system of claim 15 wherein the control circuitry is further configured to receive stored value card account information updates from the central location.

24. The system of claim 23 wherein the control circuitry is further configured to receive account information updates at pre-determined times.

25. The system of claim 23 wherein the control circuitry is further configured to receive stored value card account information updates for the stored value cards stored at the store.

26. The system of claim 15 wherein the control circuitry is further configured to:
- determine that the store is online; and
- in response to determining that the store is online, transmit stored value card account information stored at the store to the central location.

27. The system of claim 26 wherein the control circuitry is further configured to transmit information regarding stored value card transactions that were processed using stored value account information stored at the store to the central location.

28. The system of claim 15 wherein the central location is a home office.

* * * * *